No. 787,837. PATENTED APR. 18, 1905.
C. A. W. DE VORE.
APPARATUS FOR BOILING EGGS.
APPLICATION FILED APR. 19, 1904.

3 SHEETS—SHEET 2.

Witnesses:
K. H. Butler
E. E. Potter

Inventor
C. A. W. De Vore,
By N. C. Evert & Co.
Attorneys.

No. 787,837. Patented April 18, 1905.

UNITED STATES PATENT OFFICE.

CLARK A. W. DE VORE, OF MONONGAHELA, PENNSYLVANIA.

APPARATUS FOR BOILING EGGS.

SPECIFICATION forming part of Letters Patent No. 787,837, dated April 18, 1905.

Application filed April 19, 1904. Serial No. 203,874.

*To all whom it may concern:*

Be it known that I, CLARK A. W. DE VORE, a citizen of the United States of America, residing at Monongahela, in the county of Washington and State of Pennsylvania, have invented certain new and useful Improvements in Apparatus for Boiling Eggs, of which the following is a specification, reference being had therein to the accompanying drawings.

This invention has relation to apparatus for boiling eggs; and the object of the invention is to provide novel means whereby the eggs may be boiled for a certain predetermined period of time and withdrawn from the water in which they are boiled, so that they may be boiled to the exact required degree.

In carrying my invention into effect I provide one or more movable egg baskets or receptacles which are carried on movable rods mounted on a casing containing a motor mechanism by means of which and a suitable weight or weights the said rods and the said egg baskets or receptacles are removed from the water in which they are cooked after the expiration of certain predetermined variable intervals of time.

The movable rod, the egg-basket, the clockwork mechanism, the weight, and the other appurtenant parts may be permanently attached to or removably arranged on a suitable cooking vessel and one or more of the devices for removing the eggs from the boiling water may be secured to or placed in position upon a single cooking vessel.

My invention is illustrated in the accompanying drawings, wherein—

Figure 1:
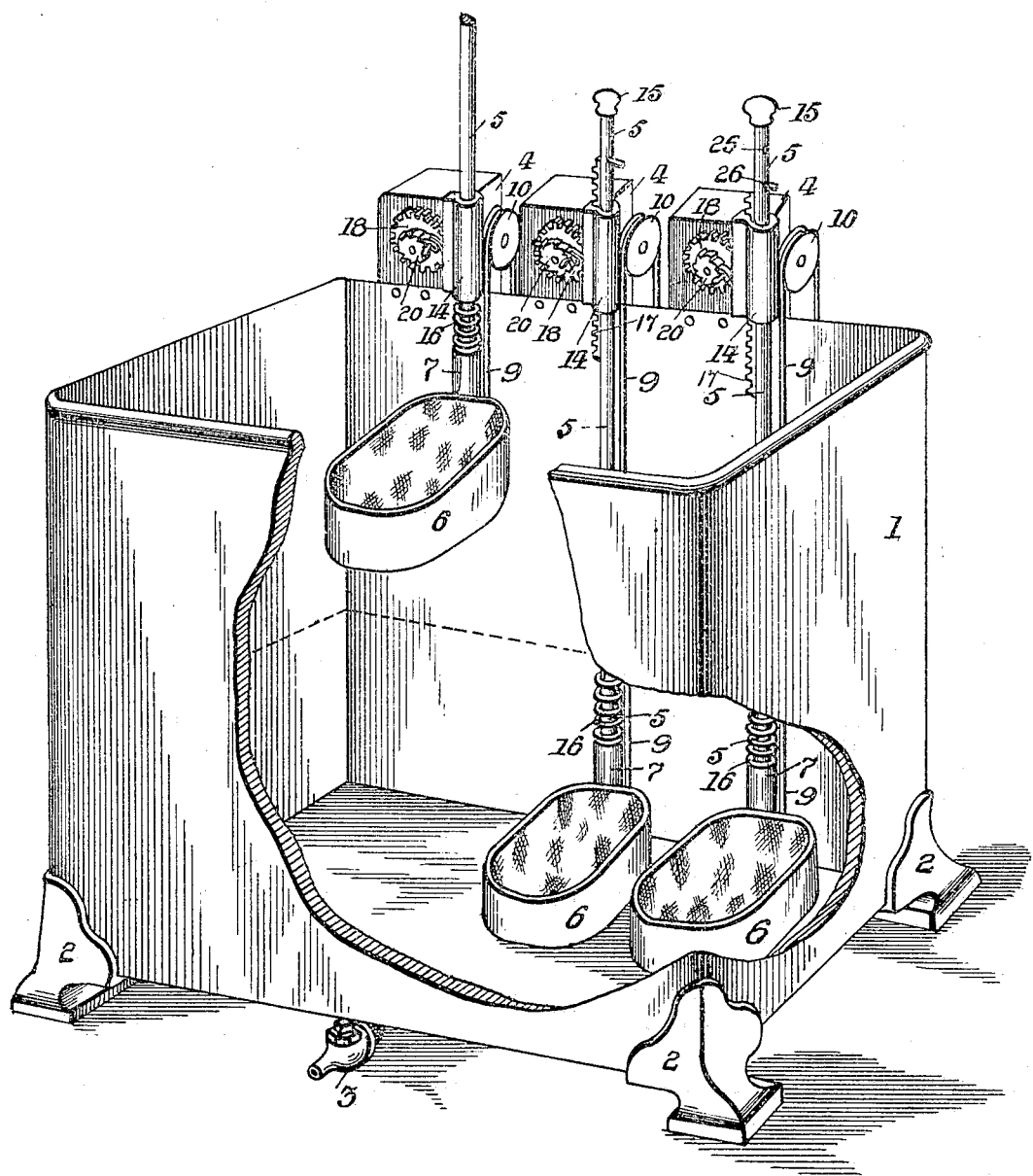
Figure 2:
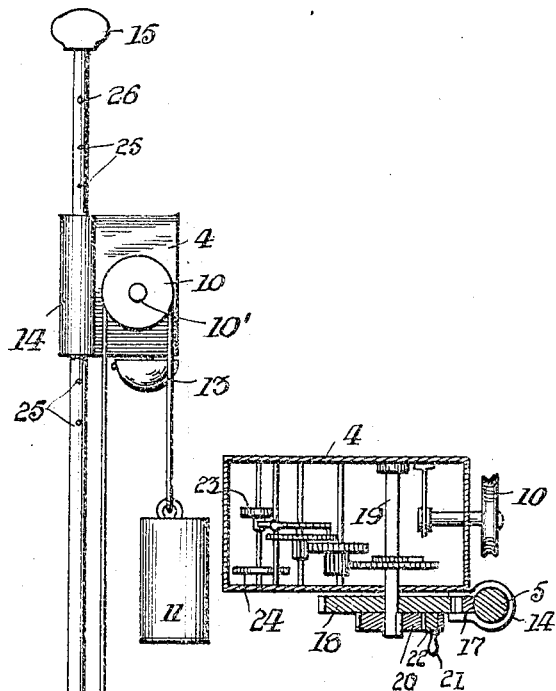
Figure 3:
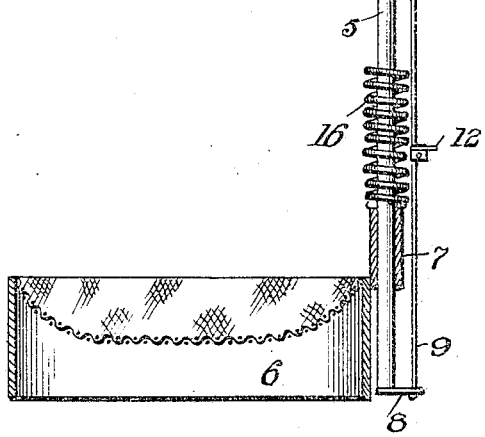

Figure 1 is a perspective view of a cooking vessel having three separately-operable egg-boiling attachments fixed in position thereon, a part of the vessel being broken away for the sake of showing the arrangement of the egg-baskets within the vessel. Fig. 2 is a side elevation, partly in section, of one of the egg-boiling devices shown in Fig. 1; and Fig. 3 is a transverse sectional view, on an enlarged scale, showing the clockwork mechanism and the sliding rod of Fig. 2.

The cooking vessel 1 shown in the drawings merely illustrates a type of vessel that may be employed in connection with my improved egg-boiling attachment, and it is to be understood that any vessel of suitable size and shape may be used in place of the vessel shown. The said vessel is supported on legs 2 2 and is provided with a faucet 3 for drawing off the water therefrom. Upon one side of the vessel, at the upper edge thereof, I arrange boxes or casings 4 4 4, which contain the clockwork mechanism by means of which sliding rods 5 5 5 are governed in their upward movement, as will be hereinafter described. Each of the rods 5 carries on its lower end a basket 6 or other suitable receptacle for holding the eggs while they are being boiled, and as each clockwork mechanism, movable rod, and egg-basket is the same I will only describe one, particular reference being had to Figs. 2 and 3 of the drawings. The egg-basket 6, which may be of any desired size and shape, is secured to a collar 7, that is fixed on the rod 5 near the lower end thereof, and upon the lower end of the rod 5 is secured a lug 8, to which is attached a cord 9, that passes over a pulley 10, mounted on a shaft 10' and carrying on its other end a weight 11. A stop 12 is carried by the cord 9, the said stop being adapted as the cord is pulled up by the descent of the weight 11 to engage the clapper of a bell 13, so as to indicate to the cook that the boiling operation has been completed.

The rod 5 slides in a sleeve 14, carried by the casing 4, and upon the upper end of the rod there is fixed a knob 15 to facilitate the depressing of the rod. A buffer-spring 16 is arranged on the rod 5 above the collar 7, and when the rod is drawn up by the weight the buffer-spring strikes against the sleeve 14 and prevents undue shock or jarring of the clockwork mechanism within the casing 4. The rod 5 has a rack 17 on one side, the said rack meshing with a gear-wheel 18, that is mounted on a shaft or arbor 19, journaled in the casing 4. The gear-wheel 18 is loosely mounted on the shaft or arbor 19, and the latter carries on its end outside the gear-wheel a ratchet-wheel 20, that is engaged by a dog 22, pivotally secured to the face of the gear-wheel 18 and provided with a handle 21, by means of which the dog may be disengaged from the ratchet-wheel when for any reason it is desired to draw the eggs up out of the water after they have been immersed therein without waiting for the elevation of the same by the weight 11.

The clockwork mechanism within the casing 4 is of the ordinary character, being composed of intermeshing gears and pinions and being provided with an escapement 23 and escapement-wheel 24, by means of which the movement of the clockwork is regulated and governed.

The rod 5 is provided with a series of holes 25 25, in one of which a pin 26 is placed to limit the downward movement of the rod, the said pin when the rod is depressed striking against the sleeve 14 and the depth to which the egg-basket is plunged within the water being limited by this pin, it being understood, of course, that the water in the vessel 1 is maintained always at or nearly at the same level, which is indicated in the dotted lines on Fig. 1, on the inside of the vessel. In the event of but a single egg-lifting device being employed a plurality of holes (designated 25) are employed, and a pin 26 is adapted to be placed in any of these holes, the rod having, if desired, numbers adjacent the holes, indicating the number of minutes the eggs will be allowed to remain in the water according to the hole in which the pin is placed. Where, however, a plurality of the sliding rods and egg-baskets are employed, the pin 26 can be a fixed pin, the pin in each rod being located at a different point, so that the rods will descend to different distances and will be caused to ascend and lift the eggs in each basket out of the water after they have been boiled for different lengths of time.

The device constructed as above described is operated in the following manner: The vessel 1 is filled with water up to the point indicated by dotted lines in Fig. 1, and the water is kept boiling by placing the vessel over a suitable gas-burner or over a fire. The eggs are placed in the basket 6, and the rod 5 is pressed down by bearing on the knob 15, the gear-wheel 18 during the descent of the rod turning freely on the shaft or arbor 19. When the pressure of the hand upon the knob 15 is released, the weight 11 acting through the connection before described starts the rod, moving in an upward direction, the movement of the rod being governed and regulated by the clockwork mechanism. As soon as the lower end of the rack reaches a point in alinement with the center of the gear-wheel the rod is free to rise, and it is pulled up swiftly by the weight 11 until it is stopped by the contact of the buffer-spring 16 with the bottom of the sleeve 14, the device shown at the left-hand corner of Fig. 1 being shown in that position which it occupies after the rack has been released from engagement with the gear-wheel and the basket has been drawn up out of the water. At the termination of the upward movement of the rod and basket the bell 13 is rung by the stop 12 and indicates to the person in charge that the cooking operation has been completed.

Each of the three devices shown in Fig. 1 is operated in the same manner, and, as before described, each can be arranged to boil eggs for a different period of time. The arrangement of the rack which is projected below the gear-wheel determines the length of time during which the eggs will be immersed in the water, this arrangement providing means whereby eggs may be cooked for three different lengths of time without any adjustment of the devices. When but one of these devices is used, it will, as before described, be provided with a series of the holes 25 and a removable pin, so that by placing the pin in one or the other of the holes 25 the rod may be depressed and will maintain the egg-basket in the water for a length of time dependent upon whichever of the holes the pin is inserted in.

Having described my invention, I claim—

1. In a device of the character described, the combination of a vertically-movable rod, a basket carried by said rod, a weight attached to the rod, a clockwork mechanism actuated by said rod in its upward movement and adapted to retard said upward movement.

2. In a device of the character described, the combination of a vertically-movable rod having a rack on its side, a basket carried by said rod, a clockwork mechanism having a gear-wheel meshing with said rack, a weight connected to the rod and adapted to lift the same.

3. In a device of the character described, a vertically-movable rod having a rack arranged on one side, a pin adapted to limit the movement of the rod, a basket carried on the lower end of the rod, a weight connected to said rod, a clockwork mechanism meshing with said rack.

4. In a device of the character described, the combination with a vertically-movable rod having a rack on its side, a basket carried by said rod, a clockwork mechanism having a loose gear-wheel meshing with said rack, a dog on said gear-wheel engaging a ratchet-wheel on one shaft of said clockwork, and a weight connected to said rod, the said rack being of less length than the rod so that at a certain position of the rod the rack will be disengaged from said gear-wheel.

In testimony whereof I affix my signature in the presence of two witnesses.

CLARK A. W. DE VORE.

Witnesses:
 H. C. EVERT,
 WM. C. HEITZ.